(12) United States Patent
Takamatsu et al.

(10) Patent No.: US 10,330,208 B2
(45) Date of Patent: Jun. 25, 2019

(54) COMPOUND VALVE

(71) Applicant: MITSUBISHI ELECTRIC CORPORATION, Chiyoda-ku, Tokyo (JP)

(72) Inventors: Ryohei Takamatsu, Tokyo (JP); Mizuki Ogawa, Tokyo (JP); Koji Saito, Tokyo (JP); Masaru Imaizumi, Tokyo (JP); Yuji Motomura, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/501,104

(22) PCT Filed: May 26, 2015

(86) PCT No.: PCT/JP2015/064986
§ 371 (c)(1),
(2) Date: Feb. 1, 2017

(87) PCT Pub. No.: WO2016/027541
PCT Pub. Date: Feb. 25, 2016

(65) Prior Publication Data
US 2017/0254425 A1    Sep. 7, 2017

(30) Foreign Application Priority Data

Aug. 22, 2014   (JP) .................................. 2014-169363

(51) Int. Cl.
*F16K 11/22*    (2006.01)
*F16K 27/06*    (2006.01)
(Continued)

(52) U.S. Cl.
CPC ........ *F16K 11/0856* (2013.01); *F16K 11/085* (2013.01); *F16K 11/22* (2013.01);
(Continued)

(58) Field of Classification Search
CPC .......... F16K 11/22; F16K 11/20; F16K 11/10; F16K 49/005; F16K 3/265; F16K 3/262;
(Continued)

(56) References Cited

U.S. PATENT DOCUMENTS 2,533,931 A    12/1950   Hartley
2,678,062 A *   5/1954   MacNeill ................ F16K 11/02
                                                              137/595
(Continued)

FOREIGN PATENT DOCUMENTS

CN          1289031 A       3/2001
CN        102112815 A       6/2011
(Continued)

OTHER PUBLICATIONS

Office Action (Notification of Reason for Refusal) dated Apr. 18, 2017, by the Japanese Patent Office in corresponding Japanese Patent Application No. 2016-543844 and English translation of the Office Action. (7 pages).
(Continued)

*Primary Examiner* — Reinaldo Sanchez-Medina
*Assistant Examiner* — David Colon-Morales
(74) *Attorney, Agent, or Firm* — Buchanan Ingersoll & Rooney PC

(57) ABSTRACT

A compound valve includes a body having a valve chamber; a cylindrical-shaped valve element having opening portions in its lateral side surface for allowing heat media to flow inside of the valve element, and a partition member there inside in the longitudinal direction; and a motor for controlling a rotation angle of the valve element, and the opening
(Continued)

portions communicate with either one of a first heat-medium inflow port or a second heat-medium inflow port, and with either one of a third heat-medium outflow port or a fourth heat-medium outflow port; two heat media having different properties flow adjacent to the partition member; and, by controlling, by a rotation angle of the motor, areas of the communicating inflow ports and the opening portions, and those of the communicating outflow ports and the opening portions, the quantities of flow are controlled.

7 Claims, 12 Drawing Sheets

(51) Int. Cl.
| F16K 11/085 | (2006.01) |
|---|---|
| F16K 31/04 | (2006.01) |
| F16K 37/00 | (2006.01) |
| F25B 41/00 | (2006.01) |
| F24F 11/89 | (2018.01) |

(52) U.S. Cl.
CPC .............. *F16K 27/06* (2013.01); *F16K 31/04* (2013.01); *F16K 37/005* (2013.01); *F24F 11/89* (2018.01); *F25B 41/003* (2013.01)

(58) Field of Classification Search
CPC ...... F16K 3/26; F16K 11/0556; F16K 11/085; F16K 11/076; F16K 11/072; F16K 11/0716; F16K 3/22; F16K 31/041; F16K 31/04; F16K 27/065; F16K 27/06; F16K 37/0091; F16K 37/005; Y10T 137/87161; Y10T 137/87153; Y10T 137/87249; F25B 41/003; F24F 11/89
See application file for complete search history.

(56) References Cited

U.S. PATENT DOCUMENTS

| | | | | |
|---|---|---|---|---|
| 3,021,869 | A * | 2/1962 | Ross | F15B 13/04 137/625.24 |
| 3,098,506 | A * | 7/1963 | Spragens | F16K 5/0471 137/625.19 |
| 3,190,584 | A * | 6/1965 | Gire | B64C 29/0091 137/625.46 |
| 3,199,539 | A | 8/1965 | Leathem | |
| 3,918,493 | A * | 11/1975 | Tobias | F16K 11/072 137/625.23 |
| 4,055,151 | A | 10/1977 | Cummings et al. | |
| 4,345,622 | A * | 8/1982 | Henningsson | F16K 11/00 137/597 |
| 4,355,659 | A * | 10/1982 | Kelchner | F16K 11/0856 137/597 |
| 4,445,540 | A * | 5/1984 | Baron | F16K 11/0856 137/625.43 |
| 4,506,703 | A | 3/1985 | Baron | |
| 4,543,996 | A | 10/1985 | Baron | |
| 4,658,859 | A * | 4/1987 | Backe | F16K 11/0856 137/625.22 |
| 4,716,923 | A * | 1/1988 | West | F16K 11/0856 137/312 |
| 4,986,307 | A * | 1/1991 | Hardee | F16K 11/072 137/624.13 |
| 5,172,725 | A * | 12/1992 | Kitagawa | F16K 11/0856 137/625.43 |
| 5,820,133 | A * | 10/1998 | Altshuler | F16K 11/0856 277/630 |
| 5,868,165 | A * | 2/1999 | Tranovich | F15B 13/0406 137/625.23 |
| 6,308,739 | B1 * | 10/2001 | Barbuto | F16K 5/0478 137/625.11 |
| 6,470,913 | B1 * | 10/2002 | Woodworth | F15B 13/0406 137/625.23 |
| 6,647,934 | B2 * | 11/2003 | Marsh | F01P 3/20 123/41.33 |
| 6,681,805 | B2 * | 1/2004 | McLane | B60H 1/00485 137/625.16 |
| 6,994,316 | B2 * | 2/2006 | Pervaiz | F16K 5/0478 251/160 |
| 7,516,942 | B2 * | 4/2009 | Grau | F16K 5/0414 251/152 |
| 7,690,397 | B2 * | 4/2010 | Hollis | F16K 11/076 137/625.47 |
| 7,814,964 | B2 * | 10/2010 | Greer | B60H 1/00485 137/595 |
| 8,733,120 | B2 | 5/2014 | Morimoto et al. | |
| 8,813,783 | B2 * | 8/2014 | Morris | F16K 11/0856 137/625.18 |
| 8,905,076 | B2 * | 12/2014 | Jorgensen | F16K 11/0856 123/41.08 |
| 9,435,447 | B2 * | 9/2016 | Wattellier | B01F 5/10 |
| 9,696,070 | B2 * | 7/2017 | Ohta | F25B 41/04 |
| 2003/0196713 | A1 | 10/2003 | Ma | |
| 2004/0040315 | A1 * | 3/2004 | Koyama | F16K 11/076 62/6 |
| 2004/0173510 | A1 * | 9/2004 | Jung | B01D 24/4642 210/108 |
| 2004/0182455 | A1 * | 9/2004 | Wells | F16K 11/207 137/594 |
| 2007/0068667 | A1 | 3/2007 | Greer | |
| 2008/0302994 | A1 * | 12/2008 | Syzkulski | F16K 11/0856 251/345 |
| 2011/0126931 | A1 | 6/2011 | Ide et al. | |
| 2011/0192184 | A1 | 8/2011 | Yamashita et al. | |
| 2012/0006050 | A1 | 1/2012 | Takayama et al. | |
| 2012/0006436 | A1 | 1/2012 | Morimoto et al. | |
| 2012/0031130 | A1 | 2/2012 | Morimoto et al. | |
| 2012/0048411 | A1 * | 3/2012 | Steyer | F16K 11/0856 137/625 |
| 2012/0180515 | A1 | 7/2012 | Morimoto et al. | |
| 2013/0134341 | A1 * | 5/2013 | Cheng | F15B 13/0406 251/304 |
| 2013/0174594 | A1 | 7/2013 | Yamashita et al. | |
| 2014/0182329 | A1 | 7/2014 | Yamashita et al. | |
| 2014/0290659 | A1 * | 10/2014 | Chen | A61M 16/0096 128/205.24 |
| 2014/0373562 | A1 * | 12/2014 | Suzuki | F25B 5/00 62/159 |
| 2014/0374081 | A1 | 12/2014 | Kakehashi et al. | |
| 2015/0000327 | A1 | 1/2015 | Kakehashi et al. | |
| 2016/0003490 | A1 | 1/2016 | Motomura et al. | |
| 2017/0191574 | A1 * | 7/2017 | Takamatsu | F16K 11/02 |
| 2017/0191706 | A1 | 7/2017 | Ogawa et al. | |

FOREIGN PATENT DOCUMENTS

| | | | |
|---|---|---|---|
| CN | 102575880 A | 7/2012 | |
| DE | 19507919 A1 * | 9/1996 | ............ F16K 11/085 |
| DE | 10 2005 031 962 A1 | 1/2007 | |
| DE | 102005031962 A1 * | 1/2007 | ............ F16K 3/262 |
| EP | 0 795 705 A1 | 9/1997 | |
| EP | 1 087 188 A1 | 3/2001 | |
| EP | 2 416 081 A1 | 2/2012 | |
| EP | 3171097 A1 | 5/2017 | |
| FR | 2656668 A1 | 7/1991 | |
| FR | 2988460 A1 | 9/2013 | |
| GB | 821898 A | 10/1959 | |
| GB | 2526486 A | 11/2015 | |
| JP | S51-083932 U | 7/1976 | |
| JP | S52-106642 U | 8/1977 | |
| JP | S59170572 A | 9/1984 | |
| JP | S60-097598 U | 7/1985 | |
| JP | 3049769 U | 6/1998 | |
| JP | 2001-091078 A | 4/2001 | |
| JP | 2007-309333 A | 11/2007 | |
| JP | 2011-043188 A | 3/2011 | |
| JP | WO 2011048724 A1 * | 4/2011 | ......... F16K 11/0856 |
| JP | 2013-230805 A | 11/2013 | |

(56) References Cited

FOREIGN PATENT DOCUMENTS

| WO | 2006/109639 A1 | 10/2006 |
|---|---|---|
| WO | WO 2010/049998 A1 | 5/2010 |
| WO | WO 2010/119555 A1 | 10/2010 |
| WO | WO 2010/137137 A1 | 12/2010 |
| WO | 2012/070192 A1 | 5/2012 |
| WO | 2014/128961 A1 | 8/2014 |
| WO | 2014/128962 A1 | 8/2017 |

OTHER PUBLICATIONS

International Search Report (PCT/ISA/210) dated Aug. 25, 2015, by the Japan Patent Office as the International Searching Authority for International Application No. PCT/JP2015/064986.

Written Opinion (PCT/ISA/237) dated Aug. 25, 2015, by the Japan Patent Office as the International Searching Authority for International Application No. PCT/JP2015/064986.

Office Action dated Jul. 20, 2018, by the Chinese Patent Office in Chinese Patent Application No. 201580033319.7 and English translation of the Office Action. (15 pages).

Office Action (First Notice of Reasons for Refusal) dated Mar. 20, 2018, by the Chinese People's People's Republic of Korea National Intellectual Property Office in Chinese Patent Application No. 201580022523.9 and an English Translation of the Office Action. (14 pages).

The extended European Search Reporting dated Jan. 19, 2018, by the European Patent Office in European Patent Application No. 15822339.6-1015. (7 pages).

The extended European Search Reporting dated Mar. 1, 2018, by the European Patent Office in European Patent Application No. 15821359.5-1015. (7 pages).

International Search Report (Form PCT/ISA/210) dated Aug. 18, 2015, by the Japanese Patent Office as the International Searching Authority for International Application No. PCT/JP2015/066600. (5 pages).

International Search Report (Form PCT/ISA/210) dated Sep. 8, 2015, by the Japanese Patent Office as the International Searching Authority for International Application No. PCT/JP2015/066601. (5 pages).

Office Action (Notification of Reasons for Refusal) dated Jan. 30, 2018, by the Japanese Patent Office in Japanese Patent Application No. 2016-534323, and an English Translation of the Office Action. (6 pages).

Office Action (Notification of Reasons for Refusal) dated Aug. 1, 2017, by the Japanese Patent Office in Japanese Patent Application No. 2016-534323, and an English Translation of the Office Action. (11 pages).

Written Opinion (Form PCT/ISA/237) dated Aug. 18, 2015, by the Japanese Patent Office as the International Searching Authority for International Application No. PCT/JP2015/066600. (6 pages).

Written Opinion (Form PCT/ISA/237) dated Sep. 8, 2015, by the Japanese Patent Office as the International Searching Authority for International Application No. PCT/JP2015/066601. (6 pages).

Extended European Search Report dated May 2, 2018, issued by the European Patent Office in corresponding European Application No. 15833371.6. (8 pages).

Office Action dated May 2, 2018 in corresponding Chinese Patent Application No. 201580038942.1, and an English machine translation thereof.

Office Action dated Dec. 27, 2018, by the Chinese Patent Office in corresponding Chinese Patent Application No. 201580038942.1 and English translation of the Office Action. (10 pages).

Office Action (Communication pursuant to Article 94(3) EPC) dated Jan. 3, 2019, by the European Patent Office in corresponding European Patent Application No. 15833371.6. (11 pages).

* cited by examiner

COMPOUND VALVE

TECHNICAL FIELD

The present invention relates to a valve used for an air-conditioning apparatus applied for example to multiple air-conditioners of building usage or the like, and more particularly to a valve whose distortion can be curbed at the time of manufacturing or the like.

BACKGROUND ART

An air-conditioning apparatus for multiple air-conditioners of building usage or the like is an apparatus in which, in general, an outdoor unit being one heat source device and indoor units individually provided in a plurality of air-conditioning target spaces are connected to one another, and the temperature of each of the air-conditioning target spaces is regulated. Conventionally, there is an apparatus in which, for example, heating or cooling of an air-conditioning target space(s) is performed by circulating a refrigerant of hydrofluorocarbon or the like between an outdoor unit placed outside of a house and indoor units placed in the air-conditioning target space(s) inside of the house, and by radiating heat or absorbing heat into/out of the air of the air-conditioning target space(s) by means of the indoor units through the refrigerant having been heated or cooled by the outdoor unit. Because, in this apparatus, a refrigerant circulates down to the indoor units due to the inherent structure, the refrigerant would be probable to leak inside of the air-conditioning target space(s).

For dealing therewith, there is an air-conditioning apparatus in which a relay unit is provided between an outdoor unit and indoor units; a refrigerant is circulated from the outdoor unit to the relay unit, and a heat medium such as water or the like is circulated from the relay unit to the indoor units; and heat is exchanged between the refrigerant and the heat medium by means of a heat-medium heat exchanger(s) included in the relay unit. In the relay unit, heat-medium flow-path changeover devices are further included; a heat medium heated by a heat-medium heat exchanger (hereinafter, referred to as a "heating-use heat medium") is transported into an indoor unit performing a heating operation, and a heat medium cooled by a heat-medium heat exchanger (hereinafter, referred to as a "cooling-use heat medium") is, into an indoor unit performing a cooling operation, respectively; and, by exchanging heat by means of the indoor units between these media and the air of air-conditioning target spaces each, a heating operation or a cooling operation can be achieved for every one of the air-conditioning target spaces (for example, Patent Document 1).

In an air-conditioning apparatus of Patent Document 1, in order to achieve a heating operation and a cooling operation for every one of indoor units, a heat-medium flow-path changeover device for changing over a kind of a heat medium (heating-use heat medium or cooling-use heat medium) is required in each one of all flow paths for transporting the heat medium from a relay unit into each of the indoor units, and a heat-medium flow-path changeover device for changing over a kind of a heat medium is required in each one of flow paths for returning the heat medium from each of the indoor units to the relay unit; namely, two of the heat-medium flow-path changeover devices are required in total per one indoor unit. Moreover, ambient temperature adjustment of an air-conditioning target space is performed by means of a flow-rate control of a heat medium transported from the relay unit into an indoor unit, so that one heat-medium flow-rate adjustment device is required per one indoor unit.

According to the manner described above, in a conventional air-conditioning apparatus, the apparatus requires two heat-medium flow-path changeover devices and one heat-medium flow-rate adjustment device for every one of indoor units; and required further are control components such as motors or the like for driving each of the devices, and/or various kinds of components for connection such as pipes for piping, fastening components, and the like.

To this end, there is a compound valve having a changeover function of two flow paths and a flow-rate adjustment function thereof (for example, refer to Patent Document 2). A heat-medium flow-path changeover device set forth in Patent Document 2 is constituted of a body for forming an outer block of the device, a flow-path changeover valve element inserted inside of the body and driven to switch over the flow paths, a flow-rate adjustment valve element for adjusting the quantity of flow, and motors for driving each of the valve elements. The body and the valve elements are manufactured by integrally molding them with a resin or the like.

RELATED ART DOCUMENTS

Patent Documents

[Patent Document 1] International Publication No. 2010/049998

[Patent Document 2] Japanese Laid-Open Patent Publication No. 2011-43188

SUMMARY OF THE INVENTION

Problems to be Solved by the Invention

A body and valve elements set forth in Patent Document 2 are unevenly distributed in their material thicknesses, and are easily distorted at the time of their molding. Particularly in the valve elements, material thicknesses of the portions coupling a first valve chamber and a second valve chamber are large, and thus the shrinkage of those portions becomes larger. For this reason, a secondary machining process step by machining work or the like is required after the molding, causing a problem of the increase in costs. In addition, with respect to one compound valve, valve element driving motors are required individually for a flow-path changeover use and for a flow-rate adjustment use, causing a problem of the increase in costs.

The present invention has been directed at solving these problems described above, and an object of the invention is to provide a compound valve used for an air-conditioning apparatus to achieve as reducing manufacturing costs and component costs by using the compound valve that has a structure in which distortion at the time of molding is relatively curbed by making material thicknesses uniform, and also has a changeover function of two flow paths and a flow-rate adjustment function thereof by means of one motor.

Means for Solving the Problems

A compound valve of an air-conditioning apparatus according to the present invention comprises a valve element being cylindrical-shaped and rotationally movable about a spindle thereof, for opening/closing flow paths of fluid media; the compound valve is characterized in that: the valve element includes a partition member being planar, having the major axis in a direction along a cylindrical axis of the valve element, and separating, along a direction of the major axis, an internal space of the cylindrical shape into spaces whose cross-sectional shapes perpendicular to the cylindrical axis are semicircular; and a plurality of opening portions each formed in an outer circumferential side surface of the valve element, for allowing inflow or outflow of fluid media, wherein the valve element is capable of controlling quantities of flows of fluid media flowing in the flow paths by altering a rotation angle about the spindle.

Effects of the Invention

A compound valve according to the present invention includes a cylindrical-shaped valve element having a partition member thereinside in the longitudinal direction, and forms two different flow paths. And then, by rotationally moving the valve element by means of a motor, the compound valve can selectively flow either one of a first heat medium or a second heat medium, and either one of a third heat medium or a fourth heat medium; namely, the function of two heat-medium flow-path changeover devices is included. Because any one of the body and the valve element which are constituent elements of the compound valve according to the present invention has a relatively uniform material thickness, it can be said that the structure is achieved in which distortion is not easily caused at the time of their molding. According to this arrangement, a secondary machining process step by machining work or the like after the molding can be reduced.

In addition, because the quantities of flows can also be controlled by controlling a rotation angle of the motor, the function of a heat-medium flow-rate adjustment device is combined as well. Because of this, a valve element driving motor used for flow-rate adjustment of a heat medium can be omitted, so that component costs can be reduced.

EMBODIMENTS FOR CARRYING OUT THE INVENTION

Embodiment 1

Hereinafter, the explanation will be made for an air-conditioning apparatus 100 in Embodiment 1 of the present invention.

Figure 1:
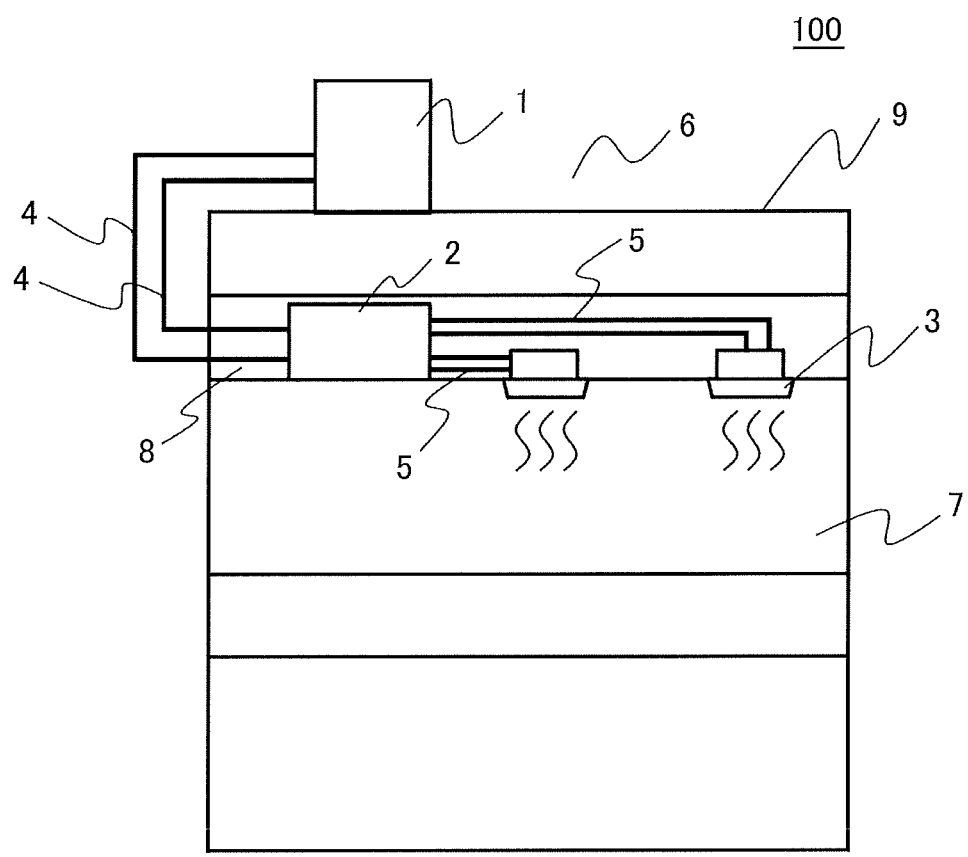
FIG. 1 is a schematic diagram illustrating an installation example of an air-conditioning apparatus according to Embodiment 1 of the present invention.

FIG. 1 is a schematic diagram illustrating an installation example of the air-conditioning apparatus 100 according to Embodiment 1 of the present invention; the entirety of the air-conditioning apparatus 100 connecting a plurality of indoor units 3 is schematically illustrated.

The air-conditioning apparatus 100 has an outdoor unit (heat source device) 1, the plurality of indoor units 3, and one relay unit 2 interposing between the outdoor unit 1 and the indoor units 3. The outdoor unit 1 is generally placed in an outdoor space 6 which is an external space (for example, on a rooftop or the like) of a house 9 such as a building or the like. In addition, the indoor units 3 are placed in an indoor space 7 which is an air-conditioning target space (for example, a living room or the like) inside of the house 9. The relay unit 2 is placed, as a separate unit different from the outdoor unit 1 and the indoor units 3, in a space 8, for example, above in the ceiling or the like different from the outdoor space 6 and the indoor space 7.

The outdoor unit 1 and the relay unit 2 are connected by way of refrigerant pipelines 4 which conduct a heat-source-side refrigerant. Moreover, the relay unit 2 and the indoor units 3 are connected by way of heat medium pipelines 5 which conduct heat media.

The air-conditioning apparatus 100 is so arranged that, by utilizing a refrigeration cycle (refrigerant circulation circuit, heat-medium circulation circuit) in which refrigerants (heat-source-side refrigerant, heat media) are circulated, a cooling mode or a heating mode in each of the indoor units 3 can be freely selected as an operation mode.

Next, the explanation will be made for the operations of the air-conditioning apparatus 100 according to Embodiment 1 of the present invention. A heat-source-side refrigerant(s) is transported from the outdoor unit 1 to the relay unit 2 by way of the refrigerant pipelines 4. The heat-source-side refrigerant(s) being transported exchanges heat with heat media by means of a heat-medium heat exchanger(s) inside of the relay unit 2, and the heat media each are heated or cooled. That is to say, by the heat-medium heat exchanger(s), hot water or cold water is generated. As for hot water or cold water generated by means of the heat-medium heat exchanger(s), the hot water or the cold water is selected by means of a compound valve 101 provided for every one of the indoor units, and is transported into the indoor units 3 by way of the heat medium pipelines 5 so as to be served by the indoor units 3 for a heating operation or a cooling operation with respect to the indoor space 7. And then, a heat medium having exchanged heat inside of the indoor units 3 each with the indoor space flows again into the compound valve 101, and hot water or cold water is selected and returned to the heat-medium heat exchanger(s).

As for the heat-source-side refrigerant, usable is, for example, a single refrigerant such as R-22, R-134a, R-32 or the like; a near-azeotropic refrigerant mixture such as R-410A, R-404A or the like; a non-azeotropic refrigerant mixture such as R-407C or the like; a refrigerant whose global warming potential is regarded relatively low in its value such as "$CF_3CF=CH_2$" or the like which contains a double bond(s) in the chemical formula, or a mixture with the refrigerant; or a natural refrigerant such as $CO_2$, propane or the like.

Meanwhile, as for the heat medium, usable is, for example, water, an antifreeze solution, a mixed fluid of water and an antifreeze solution, a mixed fluid of water and an additive having a high corrosion-prevention effect, and so forth.

Note that, in FIG. 1, a case is exemplified in which the outdoor unit 1 is placed in the outdoor space 6; however, the place is not limited to the space; it may be adopted that the outdoor unit is placed in an environment, for example, inside of a machine room or the house 9 where it is only necessary that waste heat can be exhausted therefrom to air by an exhaust duct or the like. In addition, a case is exemplified in which the relay unit 2 is placed in the space 8 above in the ceiling or the like; however, the place is not limited to the space; it may be possible to adopt that the relay unit is placed in a commonly used space or the like where an elevator or the like is installed. Moreover, a case is shown as an example in which the indoor units 3 are of ceiling cassette types; however, the types are not limited to those; any kinds of indoor units are suitable if it is so arranged that, directly or indirectly using a duct or the like, the indoor units such as ceiling embedded-type or ceiling suspended-type ones can blow off heating-use air or cooling-use air into the indoor space 7.

Furthermore, the relay unit 2 can also be placed in proximity to the outdoor unit 1. However, careful considerations are required because, if the distances from the relay unit 2 to the indoor units 3 become too long, the power for transporting the heat media increases, which prevents from achieving energy conservation.

In addition, connected unit numbers of the outdoor unit 1, the indoor units 3 and the relay unit 2 are not limited to the numbers of those units shown in FIG. 1; it is suitable that the numbers are determined in accordance with the number of air-conditioning target spaces.

When a plurality of such relay units 2 is connected with respect to one outdoor unit, it is preferable that the relay units 2 are placed so as to be interspersed with one another in such a commonly used space or a space above in the ceiling, in a house such as a building. Because of this, an air-conditioning load can be covered by a heat-medium heat exchanger inside of each of the relay units 2. In addition, the distances between the indoor units 3 and the relay units 2 can be shortened, so that energy conservation is made possible.

Figure 2:
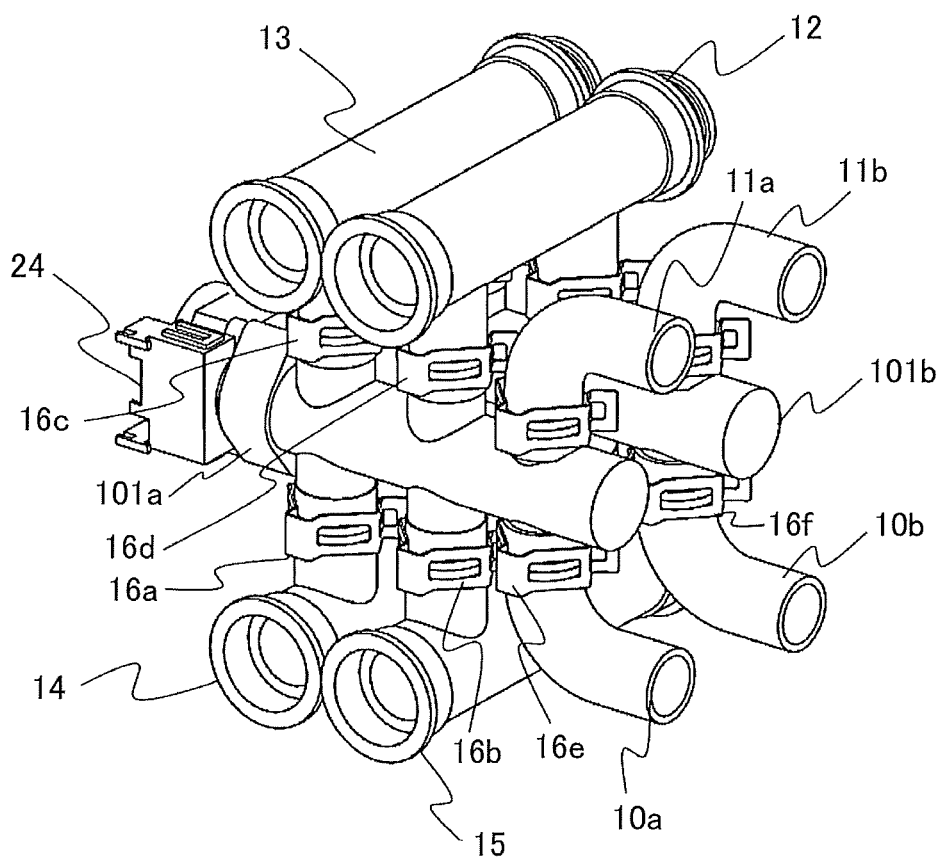
FIG. 2 is a conceptual diagram outlining a case in which two of compound valves are joined with each other in the air-conditioning apparatus according to Embodiment 1 of the present invention.

In FIG. 2, an installation example is illustrated for such compound valves 101 in Embodiment 1. The installation example indicates a case in which two of indoor units, namely, two of the compound valves 101 (101a, 101b) are placed; the compound valves each are connected to pipes 10 for transporting heat media into the indoor units 3, and to pipes 11 for returning the heat media from the indoor units 3. In addition, the compound valves 101 each are connected to or joined with a hot-water feed interconnection pipe 12 for transporting hot water generated by a heat-medium heat exchanger (hereinafter, the hot-water is referred to as a "first heat medium"), a hot-water return interconnection pipe 14 for returning thereto hot water after having exchanged its heat (hereinafter, the hot-water is referred to as a "third heat medium"), a cold-water feed interconnection pipe 13 for transporting cold water generated by a heat-medium heat exchanger (hereinafter, the cold-water is referred to as a "second heat medium"), and a cold-water return interconnection pipe 15 for returning thereto cold water after having exchanged its heat (hereinafter, the cold-water is referred to as a "fourth heat medium"). For fastening, quick fasteners 16 formed by bending sheet metal are used; and leakage of the heat media is prevented by building in O-rings, though they are not shown in the figure.

Figure 3:
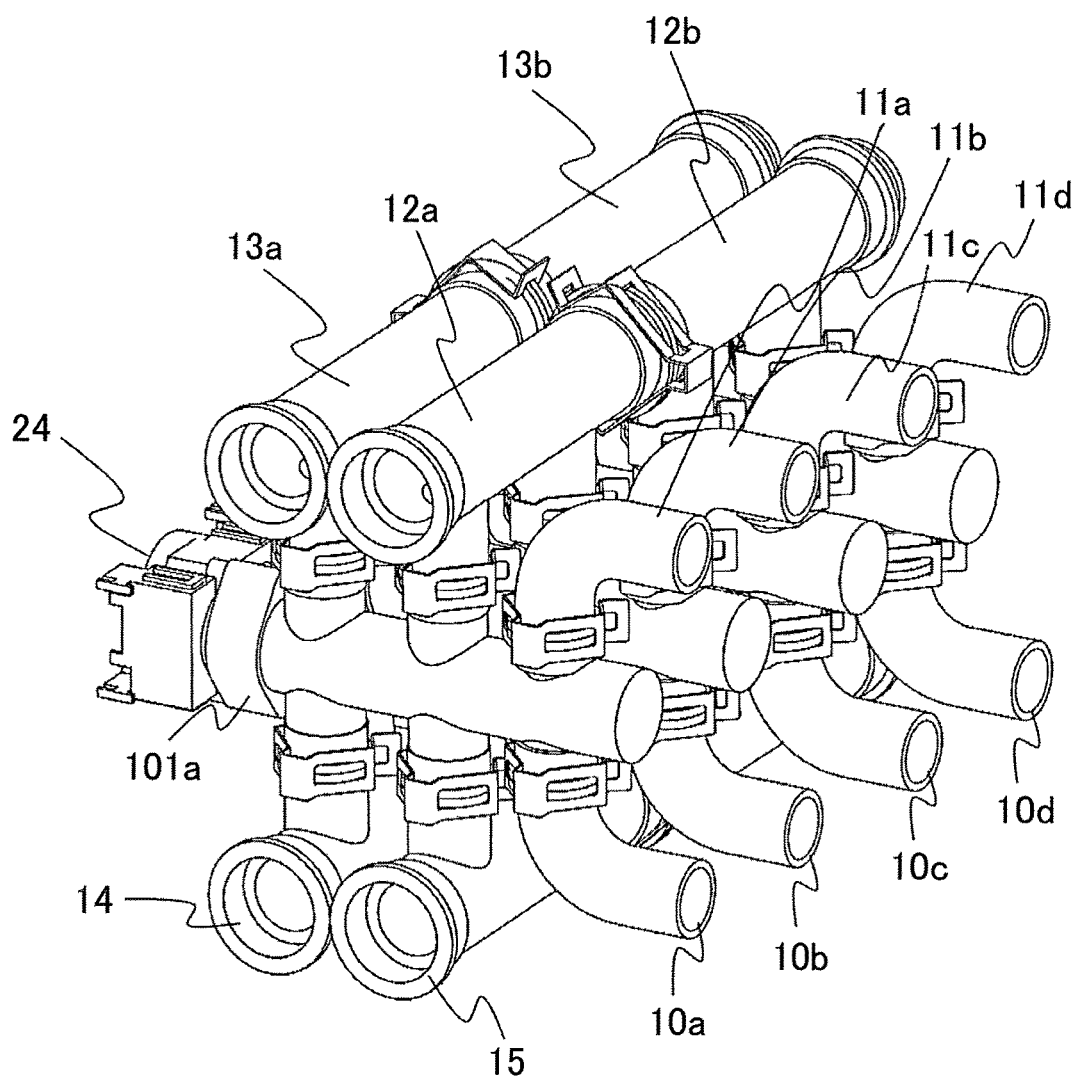
FIG. 3 is a conceptual diagram outlining a case in which four of the compound valves are joined with one another in the air-conditioning apparatus according to Embodiment 1 of the present invention.

In FIG. 3, another installation example is illustrated for the compound valves 101 in Embodiment 1 of the present invention. The installation example indicates a case in which four of indoor units, namely, four of the compound valves 101 are placed, indicating that two sets of such units each shown in FIG. 2 are placed in continuation side by side. According to the above, the compound valves 101 can be additionally extended in following with the number of requirement.

Note that, in the installation example, the hot-water feed interconnection pipes 12, the cold-water feed interconnection pipes 13, the hot-water return interconnection pipes 14 and the cold-water return interconnection pipes 15 are expanded or additionally extended by combining two sets of two of such compound valves 101 which are joined with one another; however, it is not necessarily limited to this: it is also possible to change to an arbitrary number of compound valves 101 by increasing the number of connection ports of the hot-water feed interconnection pipe(s) 12, the cold-water feed interconnection pipe(s) 13, the hot-water return interconnection pipe(s) 14 and the cold-water return interconnection pipe(s) 15 to the compound valves. Note that, the quick fasteners 16 and O-rings are used for fastening similarly to FIG. 2.

Figure 4:
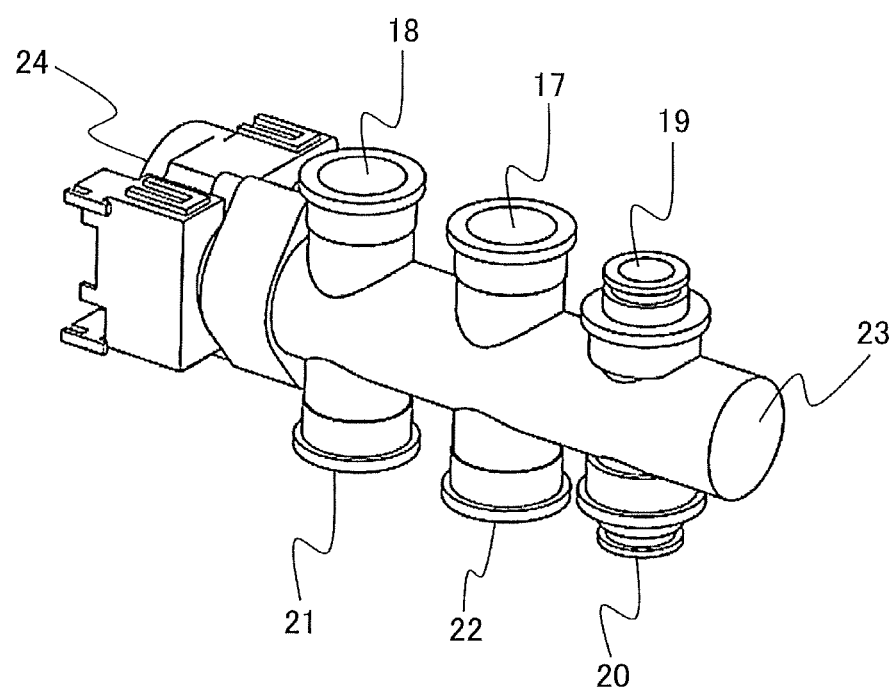
FIG. 4 is a conceptual diagram outlining a compound valve in the air-conditioning apparatus according to Embodiment 1 of the present invention.

In FIG. 4, a configuration diagram is illustrated for the compound valve 101. The compound valve 101 includes a body 23 having a first heat-medium inflow port 17, a second heat-medium inflow port 18 and a third or fourth heat-medium inflow port 20 into which the heat media each flow toward cylindrically axial directions of a cylindrical-shaped valve element, and a first or second heat-medium outflow port 19, a third heat-medium outflow port 21 and a fourth heat-medium outflow port 22 out of which the heat media each flow from cylindrically axial directions of the cylindrical-shaped valve element; and a motor 24 which is a single driving device.

Figure 5:
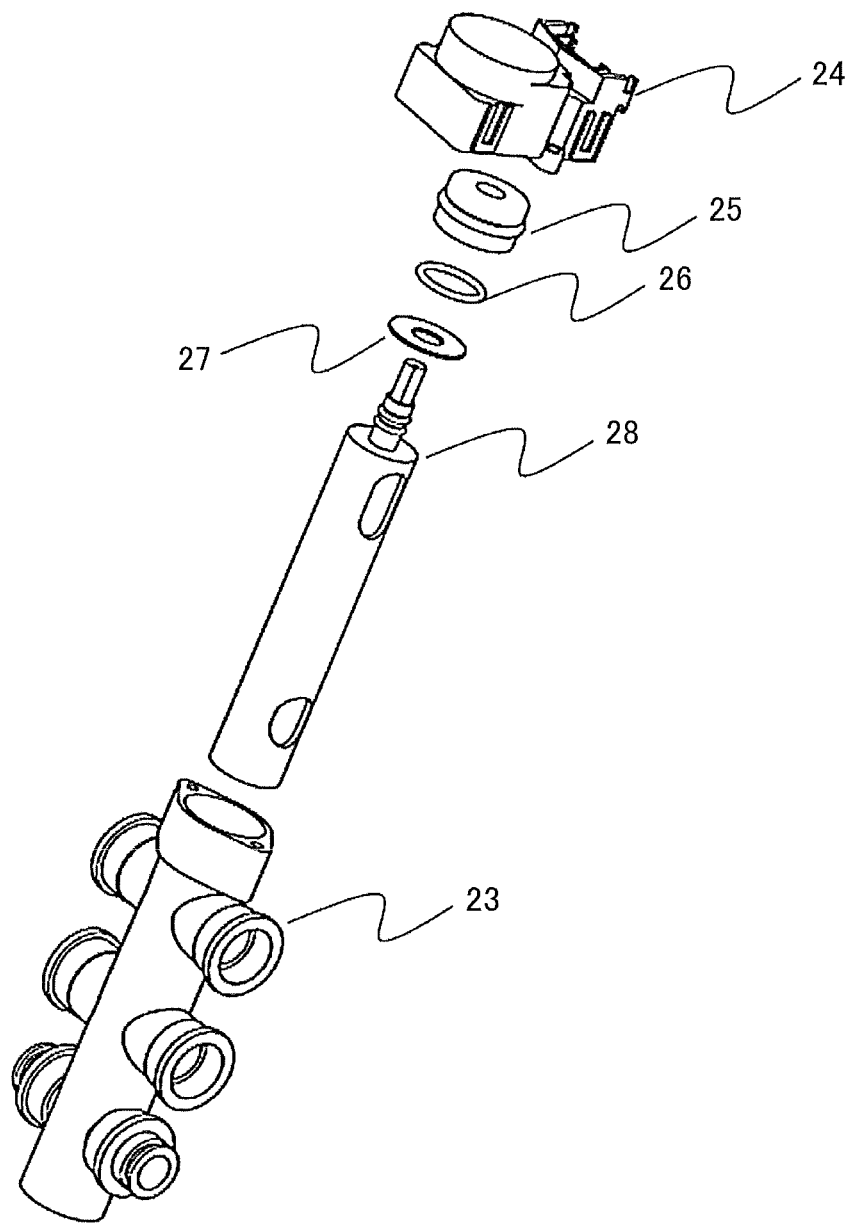
FIG. 5 is an exploded perspective diagram illustrating constituent components of the compound valve in the air-conditioning apparatus according to Embodiment 1 of the present invention.

In FIG. 5, an exploded perspective diagram is illustrated for the compound valve 101. Other than the body 23 and the motor 24 described above, the compound valve 101 includes thereinside a holder 25, O-rings 26, packing or a gasket 27, a valve element 28 of a cylindrical shape, and is constituted of other items such as screws for fastening those components, or sheet metal components therefor, though those items are not shown in the figure. The O-rings 26 each are provided between the valve element 28 and the holder 25, between the holder 25 and the gasket 27, and between the holder 25 and the body 23; the O-rings achieve the roles of preventing leakage of the heat media at each of the portions, and, at the same time, absorbing a dimensional tolerance of each of the components. The gasket 27 achieves a role to reduce torque at the time of rotation of the valve element 28; without inserting the gasket, torque required for the motor 24 increases due to the frictional resistance of the O-ring 26 between the holder 25 and the valve element 28. Because the O-ring 26 may be damaged in some cases, and leakage would be probable to be caused, it is better to attach the gasket.

Figure 6:
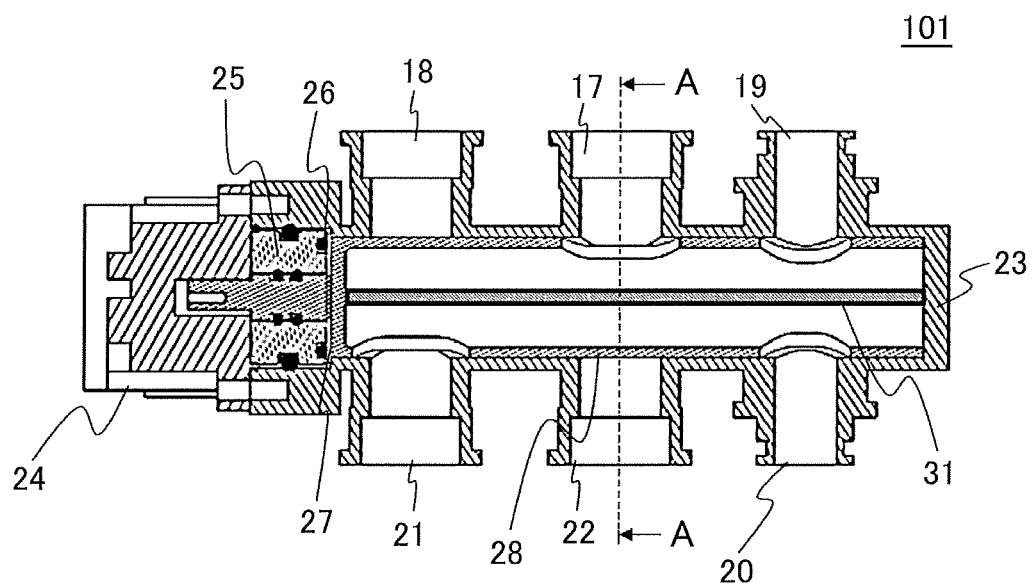
FIG. 6 is a cross section diagram illustrating a structure of the compound valve in the air-conditioning apparatus according to Embodiment 1 of the present invention.

In FIG. 6, a cross section diagram is illustrated for the compound valve 101. The valve element 28 of a cylindrical shape described above has opening portions, for allowing heat media to flow inside of the valve element, at four positions in its lateral side surface. In addition, the valve element has a partition member thereinside in the longitudinal direction, so that two different flow paths are formed thereinside.

Because the valve element 28 has a partition member 31 thereinside in the longitudinal direction (direction along a rotational spindle), two valve chambers are not partitioned by resins of material thicknesses which are large as disclosed in Patent Document 2, and thus the material thicknesses of the valve element are made relatively uniform. For this reason, when shrinkage is caused at the time of molding the valve element 28, the quantity of shrinkage is uniform in valve chamber portions of the valve element, which are thus able to shrink without undergoing distortion. According to this arrangement, a secondary process step by machining work after the molding can be omitted, and costs at the time of manufacturing can be reduced.

Moreover, because the valve element 28 has, in its internal portion, the partition member 31, the stiffness is heightened, so that distortion at the time of the operations is curbed. Note that, the partition member 31 described above is placed so that, when the shapes are cross-sectionally viewed perpendicular to a cylindrical axis of the valve element 28 of a cylindrical shape, a circular valve chamber thereof is divided in two semicircular shapes (for example, refer to FIGS. 8A through 8E).

Figure 7A:
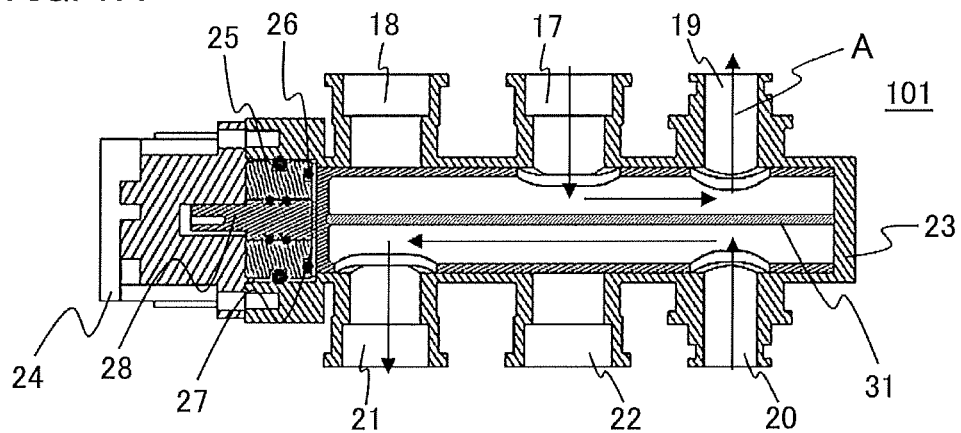
FIGS. 7A, 7B, 7C and 7D each are conceptual diagrams outlining changes of internal flow paths in accordance with a rotation angle of a valve element in the compound valve of the air-conditioning apparatus according to Embodiment 1 of the present invention.
Figure 7B:
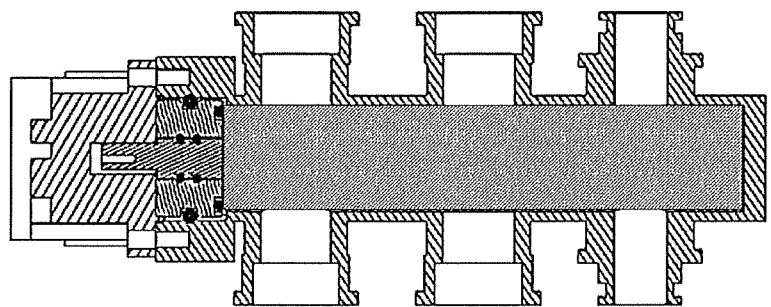
Figure 7C:
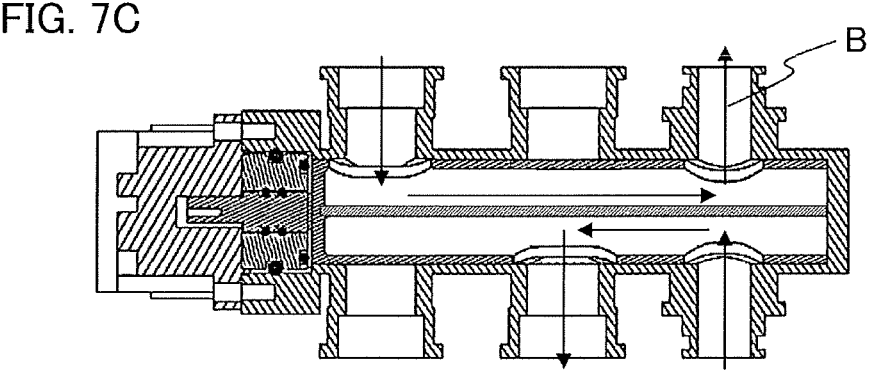
Figure 7D:
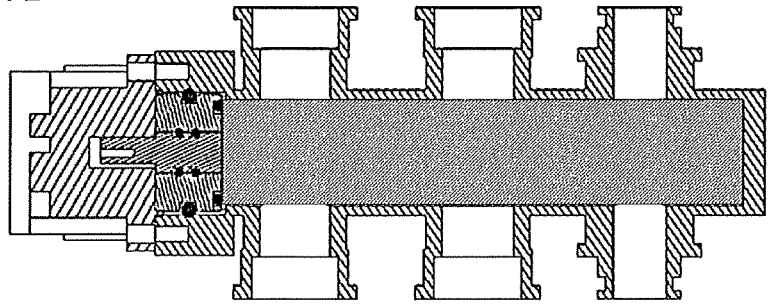

In FIGS. 7A, 7B, 7C and 7D, respective flow-path changeover flows are illustrated when the valve element 28 is rotationally moved by means of the motor 24. The valve element 28 is rotationally moved in the order of FIGS. 7A, 7B, 7C and 7D by the quantity of 90 degrees apart; the solid arrows indicate flowing directions of each of the heat media. The solid arrows "A" each indicate flows when a heat medium is hot water; and the solid arrows "B" each, flows when a heat medium is cold water. In FIG. 7A, a state is shown in which a flow path for transporting hot water (first heat medium) generated by a heat-medium heat exchanger to the indoor units 3 and a flow path for returning hot water after having exchanged its heat (third heat medium) to the heat-medium heat exchanger communicate with each other; in FIG. 7B, a blocked state, in which any of the heat media does not flow; in FIG. 7C, a state, in which a flow path for transporting cold water (second heat medium) generated by a heat-medium heat exchanger to the indoor units 3 and a flow path for returning cold water after having exchanged its heat (fourth heat medium) to the heat-medium heat exchanger communicate with each other; and, in FIG. 7D, a blocked state, in which any of the heat media does not flow.

Figure 8A:
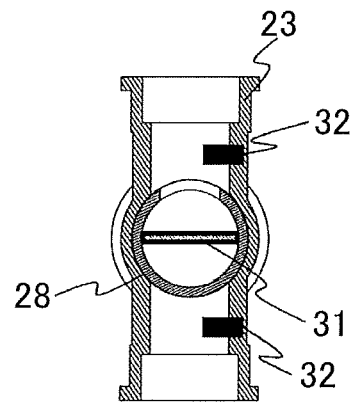
FIGS. 8A, 8B, 8C, 8D and 8E each are conceptual diagrams outlining adjustment of an opening area in accordance with a rotation angle of the valve element in the compound valve of the air-conditioning apparatus according to Embodiment 1 of the present invention.
Figure 8B:
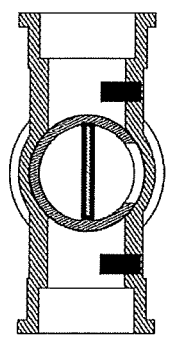
Figure 8C:
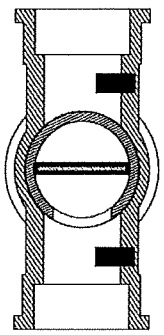
Figure 8D:
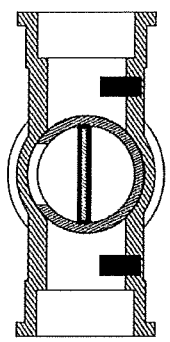
Figure 8E:
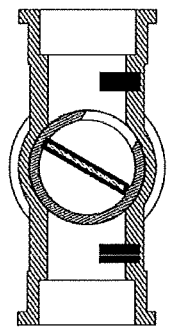

In FIGS. 8A, 8B, 8C, 8D and 8E, respective cross-sections viewed along the arrows A-A of FIG. 6 are illustrated when the valve element 28 is rotationally moved by means of the motor 24. Similarly to FIGS. 7A, 7B, 7C and 7D, the valve element is rotationally moved in the order of FIGS. 8A, 8B, 8C and 8D by the quantity of 90 degrees apart; in FIG. 8E, a state is illustrated in which a rotation angle of the motor is adjusted to be rotationally moved by the quantity of 30 degrees from FIG. 8A. According to this state of arrangement, in comparison with the case of FIG. 8A, a portion of a flow path for transporting hot water (first heat medium) generated by a heat-medium heat exchanger to the indoor units 3 each and, though not shown in the figures, a portion of a flow path for returning hot water after having exchanged its heat (third heat medium) to the heat-medium heat exchanger are partially made narrower; because pressure losses become larger, the quantities of flows are lowered. FIG. 8E shows a case of rotational movement by the quantity of 30 degrees from FIG. 8A; however, the angle is not limited to this: desired quantities of flows can be obtained by controlling an angle of the rotational movement and altering the angle to a predetermined value. Note that, inflow and outflow of heat media each are performed by way of a hollow portion of the circumferential portion shown in the middle in each of the figures, FIGS. 8A, 8B, 8C, 8D and 8E. In other words, inflow or outflow does not occur through a black hatched portion in the circumferential portion. A rotation angle of the motor, namely, the quantity of flow or a flow-rate is controlled in such a way that, for example, temperature sensors 32 are mounted at positions where a temperature of a heat media at the time of flowing into such indoor unit 3 and that of a heat media outflowing from the indoor unit 3 can be measured, and that the difference between these temperatures achieves a target value. The positions of the temperature sensors are not necessarily limited to those; it is suitable that the sensors are appropriately placed considering their mountability or the like on the apparatus.

Next, the explanation will be made for a manufacturing method of the compound valve 101. The body 23, the valve element 28 and the holder 25 are manufactured by an injection molding method using a material which contains 30% of glass fibers in a polyphenylene-sulfide resin (hereinafter, the material is referred to as a "PPS," for brevity), for example. It is preferable that the dimensional difference between an inner circumferential surface of a valve chamber of the body 23 and a lateral side surface of the valve element 28 is made as small as possible; when the difference becomes larger, the performance tends to decrease. In general, a material containing glass fibers differs in a factor of shrinkage depending on directions of fiber orientation at the time of molding (anisotropy), so that the degree of molding accuracy is easily degraded. In particular, because distortion is easily caused in a valve element due to a metal mold structure therefor, it is desirable to form a resin filler hole (gate) at the leading end of the rotational spindle of the valve element 28, and to allow a resin flowing in the same direction as much as possible. According to this arrangement, the distortion is made uniform, so that it is easy to achieve a high degree of accuracy by means of metal mold correction or the like. Note that, in the valve element in Embodiment 1, the partition member is provided inside of the valve element in its longitudinal direction, and thus the stiffness of the valve element itself is high, so that there exists a merit in which distortion is not easily caused.

As for the gasket 27, it is preferable for a material to have its frictional resistance as small as possible; for example, polytetrafluoroethylene (hereinafter, referred to as "PTFE," for brevity) is used. If the frictional resistance of the gasket is large, driving torque required for the motor 24 increases as described above. The gasket 27 is manufactured, for example, by forming PTFE in a shape of sheet using an extrusion molding method, and by punching the sheet by a press die.

O-rings are manufactured by means of press forming using ethylene-propylene rubber (here, referred to as "EPDM," for brevity), for example.

The hot-water feed interconnection pipe 12, the cold-water feed interconnection pipe 13, the hot-water return interconnection pipe 14 and the cold-water return interconnection pipe 15 are manufactured by an injection molding method using a PPS, for example.

The pipe 10 and the pipe 11 are manufactured by using copper pipes, for example.

Next, the explanation will be made for an assembling method of each of the components manufactured as described above. First, the valve element 28 is inserted into the body 23; and, subsequently thereon, the gasket 27 is attached, and the holder 25 to which O-rings have been attached in advance is mounted. And then, the motor 24 is fixed on the body 23 using sheet metal, screws or the like.

Next, two of such compound valves 101 having been assembled according to the aforementioned procedure are joined by the hot-water feed interconnection pipe 12, the cold-water feed interconnection pipe 13, the hot-water return interconnection pipe 14 and the cold-water return interconnection pipe 15 with one another, and are fastened by the quick fasteners 16 to become unitary as shown in FIG. 2. And then, a plurality of such units is manufactured so that a desired number of the compound valves 101 is achieved, and, as shown in FIG. 3, the hot-water feed interconnection pipes 12, the cold-water feed interconnection pipes 13, the hot-water return interconnection pipes 14 and the cold-water return interconnection pipes 15 are joined with one another so as to be additionally extended.

It should be noted that, when desired connection ports are formed for the compound valves 101 in the hot-water feed interconnection pipe 12, the cold-water feed interconnection pipe 13, the hot-water return interconnection pipe 14 and the cold-water return interconnection pipe 15, it is no more required to perform joining work between the aforementioned units each other. Namely, the more the connection ports of the hot-water feed interconnection pipe 12, the cold-water feed interconnection pipe 13, the hot-water return interconnection pipe 14 and the cold-water return interconnection pipe 15 are formed, the less the fastening components and the work to be conducted therefor are involved.

Lastly, the units of the compound valves 101 manufactured as described above are mounted in the relay unit 2, and the pipes 10 and the pipes 11 are attached.

According to the arrangement described above, it is possible to obtain the compound valve 101 that doubly serves the functions of two of a heat-medium flow-path changeover device and a heat-medium flow-rate adjustment device. Accordingly, the number of heat-medium control components (heat-medium flow-path changeover device, heat-medium flow-rate adjustment device), and various kinds of components such as pipes for piping, fastening components and the like can be reduced, so that the apparatus can be made in small size, or the reduction of manufacturing costs can be achieved.

In addition to the above, three motors (driving devices) are conventionally used in order to control one driving device for two of a heat-medium flow-path changeover devices and a heat-medium flow-rate adjustment device; however, in Embodiment 1, the number of the motors is reduced to one, and so an effect can also be achieved that, in addition to the miniaturization of the apparatus or the reduction of manufacturing costs, energy conservation is enhanced. In addition, as exactly described in FIGS. 7B and 7D, an effect can also be achieved that, by obtaining a blocked state in which any heat medium does not flow through a 'specific' compound valve(s) 101, upkeep service and maintenance of a specific indoor unit(s) and piping components can be performed while in a state of operating other indoor units 3.

Note that, in Embodiment 1, it has been described that the body 23 or the valve element 28 is manufactured, using a PPS as a material thereof, by an injection molding method; however, it is not necessarily limited to this: it may also be adopted that another resin or another molding method is used. In addition, the body or the valve element may be manufactured by a forging method or a casting method using a metallic material of brass or the like.

Moreover, it has been described that the gasket 27 is manufactured by combining an extrusion molding method and press working using PTFE; however, it is not necessarily limited to these: it may also be adopted that another manufacturing method such as a compression molding method or the like is used. In addition, the property of material is not necessarily limited to this; using a material of a low coefficient of friction, for example, a tetrafluoroethylene-perfluoroalkylvinyl ether copolymer (PFA) or the like, the gasket may be manufactured by an injection molding method.

It has also been described that the hot-water feed interconnection pipe 12, the cold-water feed interconnection pipe 13, the hot-water return interconnection pipe 14 and the cold-water return interconnection pipe 15 are manufactured by an injection molding method using a PPS; however, it is not necessarily limited to these: it may also be adopted that another resin or another molding method is used. In addition, the pipes may be formed using metal pipes made of copper, stainless steel or the like.

It has also been described that the pipe 10 and the pipe 11 are manufactured by using copper pipes; however, it is not necessarily limited to this: it may also be adopted that metal pipes made of stainless steel or the like are used. In addition, the pipes may be manufactured by an injection molding method, a blow molding method or the like using a resin material such as a PPS or the like.

Furthermore, it has been described that the quantity of flow or a flow-rate is controlled by controlling a rotation angle of the motor; however, it is not necessarily limited to this: it may also be adopted that a device simply capable of switching over (ON/OFF device or the like) is used when flow-rate adjustment is not required.

Embodiment 2

Hereinafter, the explanation will be made for a compound valve 102 according to Embodiment 2 of the present invention. Note that, as to configurations, functions and effects of the compound valve 102 in Embodiment 2, the same reference numerals and symbols designate the same or equivalent items or portions in Embodiment 1 described above, and thus their explanation is omitted.

Figure 9:
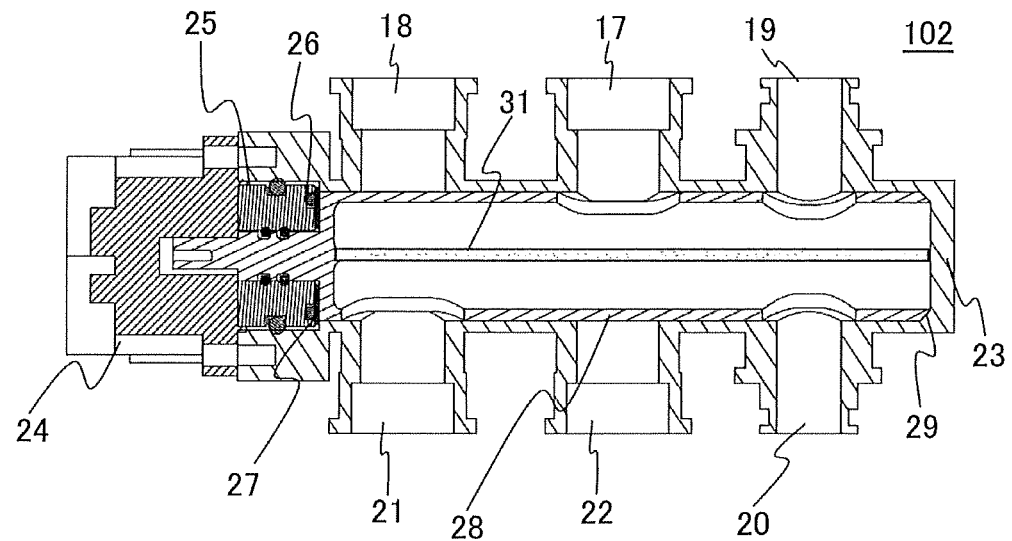
FIG. 9 is a cross section diagram illustrating a structure of a compound valve in an air-conditioning apparatus according to Embodiment 2 of the present invention.

In FIG. 9, a cross section diagram is illustrated for the compound valve 102 of Embodiment 2. At a valve chamber's bottom surface of the body in the compound valve 102, a taper portion 29 is formed, and a member which coincides with the taper portion is provided at the leading end of the valve element. According to this arrangement, the wobble or unevenness of the valve element can be curbed when the valve element is driven by the motor 24, and it is possible to curb the increase in required driving torque due to the contact of the valve element with the body. In addition, by using a material of a low coefficient of friction for the body 23 and the valve element 28, for example, using a material which enhances the resistance to wear by containing PTFE in a PPS or a like material, the required driving torque can be further reduced.

Embodiment 3

Hereinafter, the explanation will be made for a compound valve 103 according to Embodiment 3 of the present invention. Note that, as to configurations, functions and effects of the compound valve 103 in Embodiment 3, the same reference numerals and symbols designate the same or equivalent items or portions in Embodiment 1 and Embodiment 2 described above, and thus their explanation is omitted.

Figure 10:
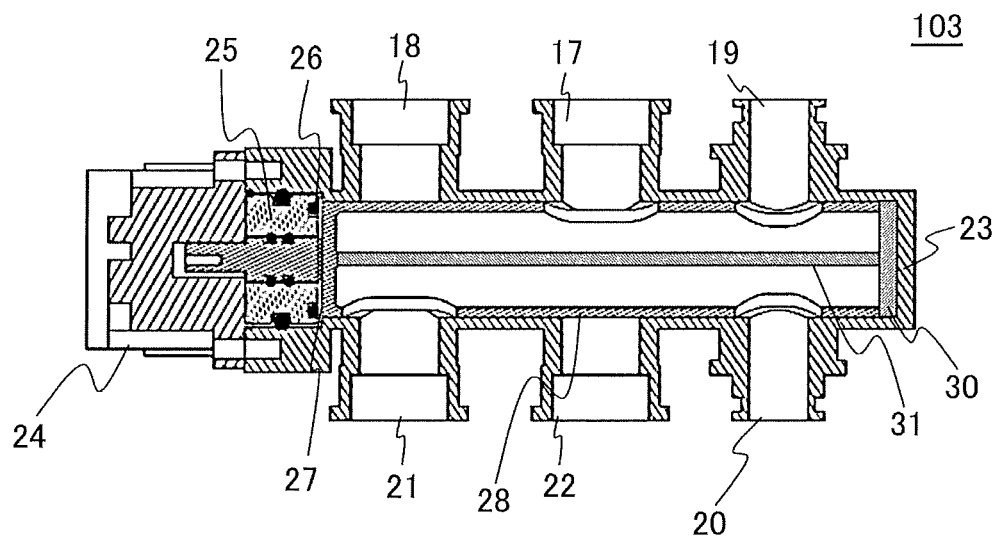
FIG. 10 is a cross section diagram illustrating a structure of a compound valve in an air-conditioning apparatus according to Embodiment 3 of the present invention.

In FIG. 10, a cross section diagram is illustrated for the compound valve 103 of Embodiment 3. In the compound valve 103, packing or a gasket 30 is provided between a valve chamber's bottom surface of the body 23 and the leading end of the valve element 28. By sandwiching the gasket 30 by the body and the valve element, leakage of the heat media between the body and the valve element is curbed, so that such an effect can be achieved as enhancing the performance. In addition, as for the property of material of the gasket 30, driving torque of the valve element can be curbed by using a material of a low coefficient of friction as much as possible, for example, using PTFE. Moreover, the wearing away of the valve element and the body is curbed, and so an effect of long operating life can also be achieved. As for a manufacturing method of the gasket 30, similarly for that of the gasket 27 described above, a sheet formed by an extrusion molding method may be punched by a press die, or the sheet may also be treated by cutting work.

Embodiment 4

Hereinafter, the explanation will be made for a compound valve 104 according to Embodiment 4 of the present invention. Note that, as to configurations, functions and effects of the compound valve 104 in Embodiment 4, the same reference numerals and symbols designate the same or equivalent items or portions in Embodiment 1, Embodiment 2 and Embodiment 3 described above, and thus their explanation is omitted.

Figure 11:
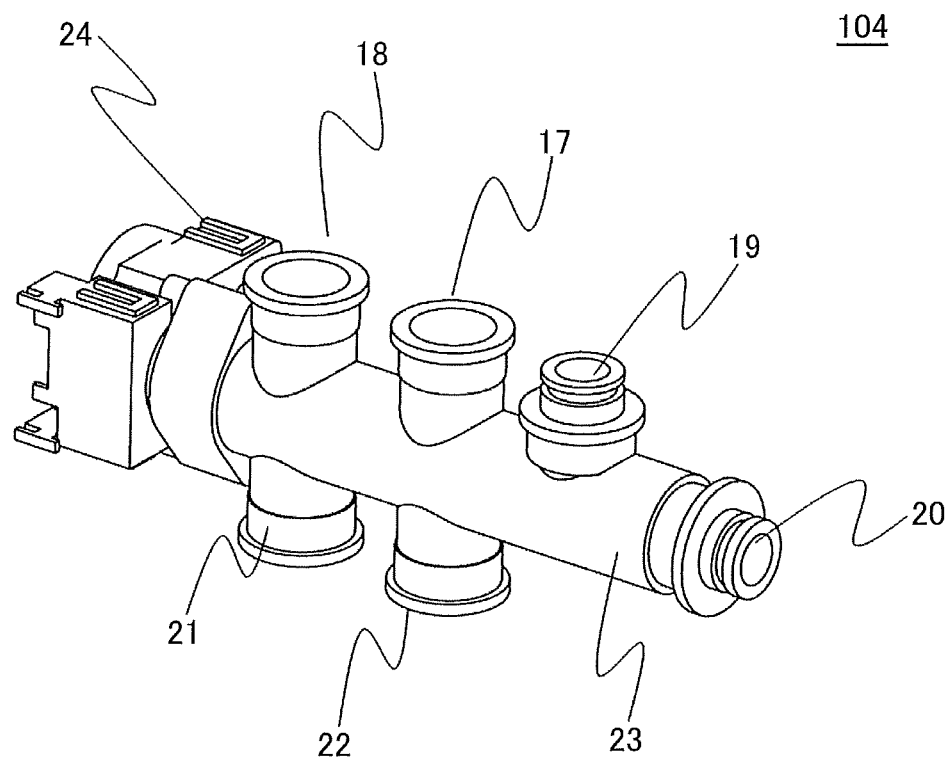
FIG. 11 is a perspective diagram illustrating a compound valve in Embodiment 4 of the present invention.
Figure 12:
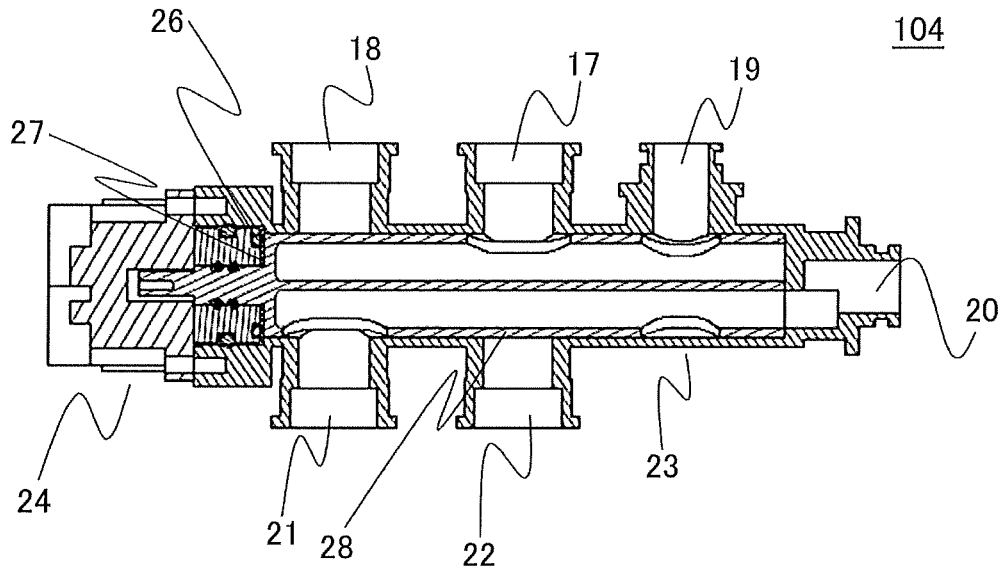
FIG. 12 is a cross section diagram illustrating the compound valve in Embodiment 4 of the present invention.
Figure 13:
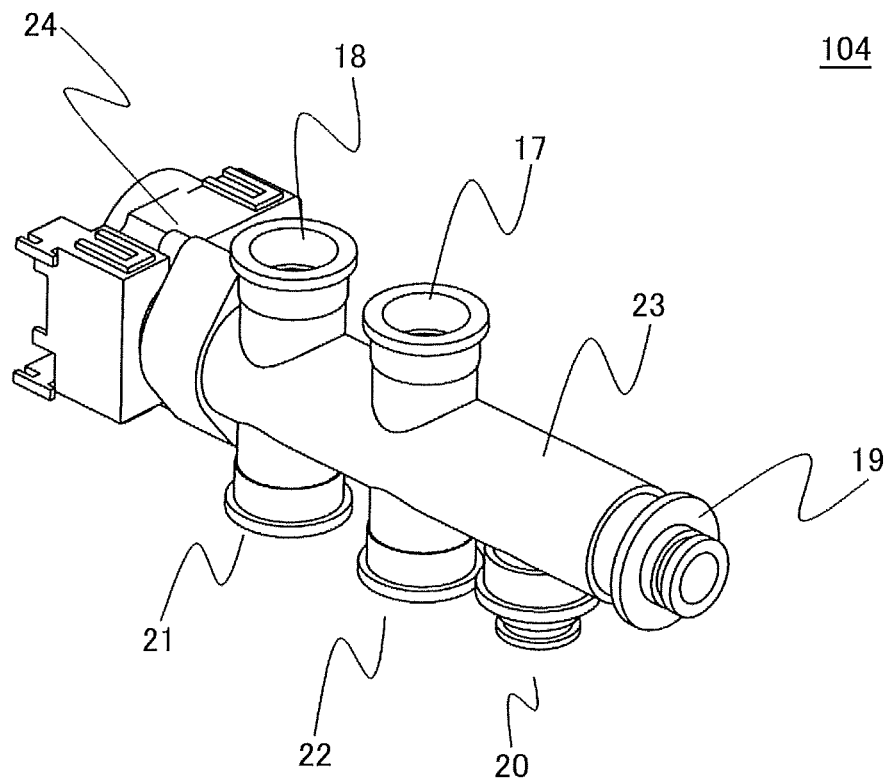
FIG. 13 is a component layout diagram for a relay unit in Embodiment 4 of the present invention.

In FIG. 11 and FIG. 12, a perspective diagram and a cross section diagram are illustrated for the compound valve 104 of Embodiment 4, respectively. In the compound valve 104, the third or fourth heat-medium inflow port 20 is formed in a valve chamber's bottom surface of the body 23. In addition, the valve element communicates through its bottom surface with the valve chamber. According to this arrangement, a pipe in a straight structure for piping can be used for the pipe 10 instead of its structure curbed by the quantity of 90 degrees. For this reason, there exists an effect in which the installation-space reduction of the compound valve(s) can be achieved, so that a relay unit can be made in small size, or different components can be provided at positions in place of the pipe 10, or so forth. Moreover, in following with a component layout for a relay unit as illustrated in FIG. 13, the first or second heat-medium outflow port 19 can be formed in a valve chamber's bottom surface of the body 23.

Embodiment 5

Hereinafter, the explanation will be made for a compound valve 105 according to Embodiment 5 of the present invention. Note that, as to configurations, functions and effects of the compound valve 105 in Embodiment 5, the same reference numerals and symbols designate the same or equivalent items or portions in Embodiment 1, Embodiment 2, Embodiment 3 and Embodiment 4 described above, and thus their explanation is omitted.

Figure 14:
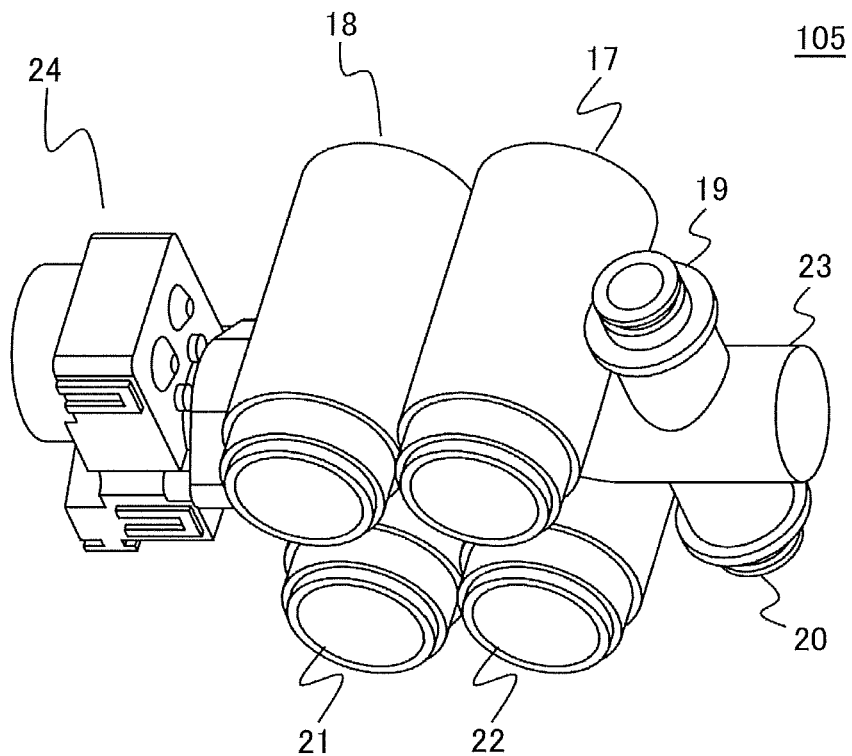
FIG. 14 is a perspective diagram illustrating a compound valve in Embodiment 5 of the present invention.
Figure 15:
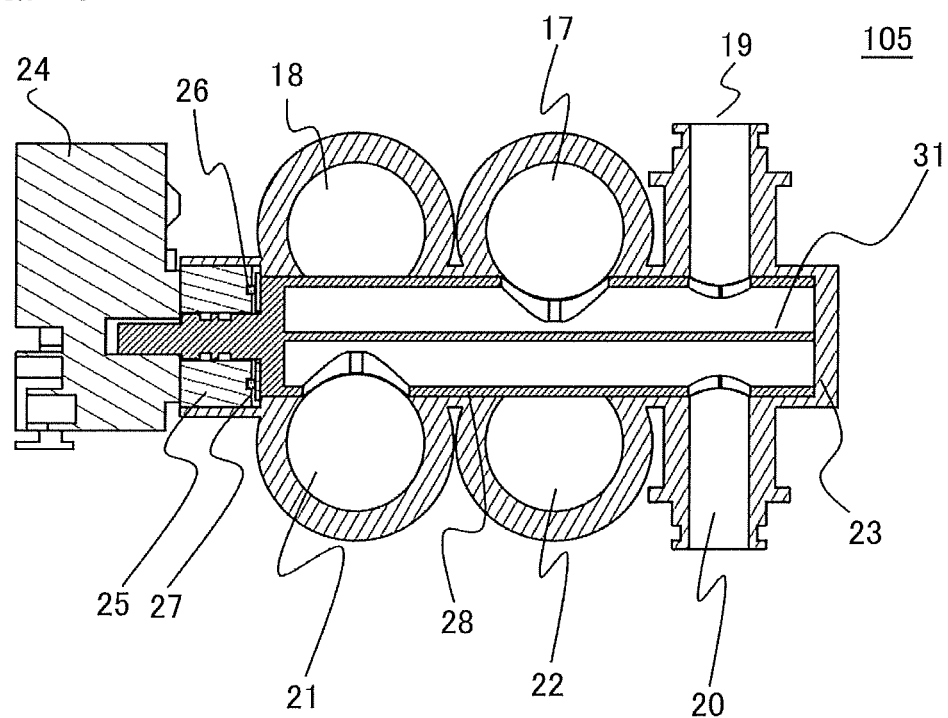
FIG. 15 is a cross section diagram illustrating the compound valve in Embodiment 5 of the present invention.
Figure 16:
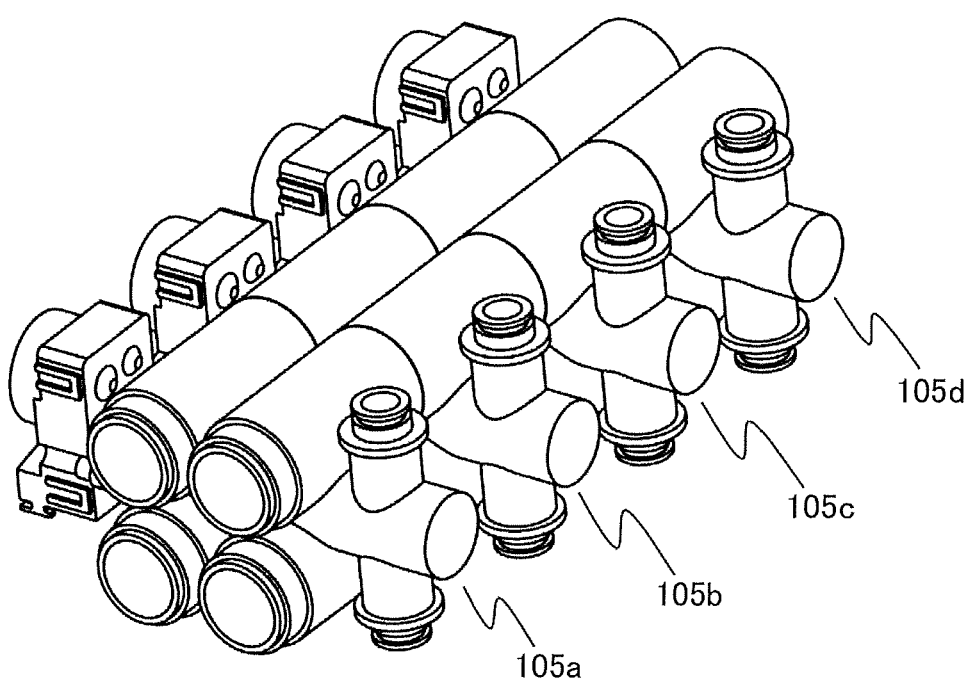
FIG. 16 is a perspective diagram illustrating a case in which four of the compound valves in Embodiment 5 of the present invention are joined with one another.

In FIG. 14 and FIG. 15, a perspective diagram and a cross section diagram are illustrated for the compound valve 105 of Embodiment 5, respectively. The compound valve 105 comprises, in its cylindrically outer circumferential portions for four kinds of heat media, inflow ports and outflow ports of such a first heat-medium inflow port 17, a second heat-medium inflow port 18, a third heat-medium outflow port 21 and a fourth heat-medium outflow port 22 each of which has a connection portion with the valve element 28; and the compound valve has a structure capable of mutually joining with one another between a first heat-medium inflow port and (contiguously thereto) another first heat-medium inflow port, between a second heat-medium inflow port and (contiguously thereto) another second heat-medium inflow port, between a third heat-medium outflow port and (contiguously thereto) another third heat-medium outflow port, and between a fourth heat-medium outflow port and (contiguously thereto) another fourth heat-medium outflow port. In FIG. 16, a perspective diagram is illustrated for a case in which such compound valves 105 are joined with one another in a group of four. According to the structure described above, such bodies 23 themselves can be joined with one another, so that it is possible to omit the hot-water feed interconnection pipe 12, the cold-water feed interconnection pipe 13, the hot-water return interconnection pipe 14 and the cold-water return interconnection pipe 15 shown in FIG. 2. Note that, by utilizing a portion of the structure described above, it is needless to say that, for example, only the cold-water feed interconnection pipe 13 and the cold-water return interconnection pipe 15 that are devices related to the cold water can be omitted. By utilizing the structures explained above, there exist advantageous effects in which the installation-space reduction of the compound valve(s) can be achieved, a relay unit can be made in small size, and so forth. Note that, in the present invention, each of the embodiments can be freely combined, and/or each of the embodiments can be appropriately modified or eliminated without departing from the scope of the invention.

EXPLANATION OF NUMERALS AND SYMBOLS

Numeral "1" designates an outdoor unit; "2," relay unit; "3," indoor unit; "4," refrigerant pipeline; "5," heat medium pipeline; "6," outdoor space; "7," indoor space; "8," space; "9," house; "10," pipe; "11," pipe; "12," hot-water feed interconnection pipe; "13," cold-water feed interconnection pipe; "14," hot-water return interconnection pipe; "15,"

cold-water return interconnection pipe; "16," quick fastener; "17," first heat-medium inflow port; "18," second heat-medium inflow port; "19," first or second heat-medium outflow port; "20," third or fourth heat-medium inflow port; "21," third heat-medium outflow port; "22," fourth heat-medium outflow port; "23," body; "24," motor; "25," holder; "26," O-ring; "27," gasket; "28," valve element; "29," taper portion; "30," gasket; "31," partition member; "32," temperature sensor; "101," "101*a*," "101*b*," compound valve; "102," compound valve; "103," compound valve; "104," compound valve; "105," compound valve; "A," hot-water flow direction; and "B," cold-water flow direction.

What is claimed is:

1. A compound valve, comprising:
   a valve element being cylindrical-shaped and rotationally movable about a spindle thereof, for opening/closing flow paths of fluid media, wherein:
   the valve element includes a partition member being planar, having a major axis in a direction along a cylindrical axis of the valve element, and separating, along a direction of the major axis, an entire internal space of the cylindrical shape into only two valve chambers whose cross-sectional shapes perpendicular to the cylindrical axis are semicircular and separated by the partition member; and
   a plurality of opening portions each formed in an outer circumferential side surface of the valve element, for allowing inflow or outflow of fluid media, wherein the valve element is configured to control quantities of flows of fluid media flowing in the flow paths by altering a rotation angle about the spindle,
   a body being made hollow and coaxially placed along an outer circumference of the valve element, and having, in an outer circumferential surface of the body, a first heat-medium inflow port, a second heat-medium inflow port, a first/second heat-medium outflow port, a third/fourth heat-medium inflow port, a third heat-medium outflow port, and a fourth heat-medium outflow port; and
   a motor placed in a cylindrically axial direction of the valve element and connected to the valve element, for altering a relative position of the partition member with respect to the opening portions by rotationally moving the valve element, wherein
   opening portions of the valve element communicate on a respective one-to-one basis, by rotationally moving the valve element by the motor, with only one of the first heat-medium inflow port or the second heat-medium inflow port, and with only one of the third heat-medium outflow port or the fourth heat-medium outflow port; different kinds of heat media flow adjacently to each other bordering the partition member; and, at a same time, quantities of flows of the different kinds of heat media are controlled by altering the relative position so as to correspondingly change an opening area of one opening portion with either communicating one of the first heat-medium inflow port or the second heat-medium inflow port, and that of another opening portion with either communicating one of the third heat-medium outflow port or the fourth heat-medium outflow port.

2. The compound valve as set forth in claim 1, further comprising:
   sensors mounted at respective positions and configured to measure a temperature of a heat medium flowing into an indoor unit of an air-conditioning apparatus including therein the valve element and the body, and a temperature of a heat medium outflowing from the indoor unit, wherein
   the motor alters a relative position of the partition member whose position is set as a target value in accordance with a temperature difference between temperatures of said two kinds of heat media.

3. The compound valve as set forth in claim 1, wherein a taper portion is formed at a bottom surface of the body opposing to the valve element, and also a member coinciding with the taper portion is provided at a leading end of the valve element.

4. The compound valve as set forth in claim 1, further comprising: a gasket sandwiched between the body and the valve element, and placed on a bottom surface of the body and at a leading end of the valve element.

5. The compound valve as set forth in claim 4, wherein a material of a low coefficient of friction is used as a material for the gasket.

6. The compound valve as set forth in claim 1, wherein the first/second heat-medium outflow port, or the third/fourth heat-medium inflow port is formed in a bottom surface of a valve chamber of the body.

7. The compound valve as set forth in claim 1, wherein the compound valve has a structure configured to mutually join with another compound valve between a first heat-medium inflow port and another first heat-medium inflow port of the another compound valve, between a second heat-medium inflow port and another second heat-medium inflow port of the another compound valve, between a third heat-medium outflow port and another third heat-medium outflow port of the another compound valve, and between a fourth heat-medium outflow port and another fourth heat-medium outflow port of the another compound valve.

* * * * *